United States Patent [19] Guertin

[11] Patent Number: 4,971,121
[45] Date of Patent: Nov. 20, 1990

[54] FLUID DISPENSING NOZZLE CONSTRUCTION, BELLOWS-LIKE TUBE THEREFOR AND METHODS OF MAKING THE SAME

[75] Inventor: Robert W. Guertin, Cincinnati, Ohio

[73] Assignee: Dover Corporation, New York, N.Y.

[21] Appl. No.: 418,566

[22] Filed: Oct. 10, 1989

Related U.S. Application Data

[63] Continuation of Ser. No. 239,178, Aug. 31, 1989, abandoned, which is a continuation of Ser. No. 16,633, Feb. 19, 1987, abandoned.

[51] Int. Cl.[5] .......... F16J 3/00; B67C 3/34; B65B 3/18

[52] U.S. Cl. .......... 141/392; 141/1; 141/59; 141/198; 141/346; 141/206; 141/290; 277/212 FB; 285/226; 464/80; 464/175

[58] Field of Search .......... 141/206–229, 141/59, 128, 198, 346, 347, 290, 302, 392; 138/109, 111, 112; 271/212 FB; 285/226–229; 464/79, 80, 173, 175

[56] References Cited

U.S. PATENT DOCUMENTS

| | | | |
|---|---|---|---|
| 3,003,526 | 10/1961 | Bell, Jr. | 141/208 |
| 3,487,574 | 1/1970 | Loof | 138/121 X |
| 3,511,061 | 5/1970 | Burckhardt | 277/212 FB |
| 3,605,817 | 8/1971 | Bauman et al. | 138/121 |
| 3,794,080 | 2/1974 | Huston et al. | 138/121 |
| 4,033,389 | 7/1977 | Hansel et al. | 141/207 |
| 4,143,689 | 3/1979 | Conley et al. | 141/207 |
| 4,204,563 | 5/1980 | Pyle | 141/206 |
| 4,235,427 | 11/1980 | Bialobrzeski | 277/212 FB |
| 4,278,262 | 7/1981 | Mizutani et al. | 277/212 FB |
| 4,286,635 | 9/1981 | McNath | 141/98 |
| 4,360,104 | 11/1982 | Lang | 138/121 |
| 4,557,302 | 12/1985 | Sunderhaus | 141/207 |
| 4,673,188 | 6/1987 | Matsuno et al. | 277/212 FB |

FOREIGN PATENT DOCUMENTS

| | | | |
|---|---|---|---|
| 1082089 | 5/1960 | Fed. Rep. of Germany | 285/226 |

*Primary Examiner*—Ernest G. Cusick
*Attorney, Agent, or Firm*—Kinney and Schenk

[57] ABSTRACT

A fluid dispensing nozzle construction, bellows-like tube therefor and methods of making the same are provided, the construction comprising a valve body having a dispensing spout extending therefrom, and a flexible bellows-like tube of polymeric material telescopically disposed on the spout and having opposed ends one of which is secured to the valve body and the other of which carries a face seal for engaging an annular lip of fill pipe of a fluid storage tank to seal around an opening in the fill pipe when the spout is inserted therein, the spout having an abutment for interlocking with an abutment of the fill pipe that is adjacent the opening thereof when the spout has been inserted into the opening a certain amount. The bellows-like tube has an annular convolution adjacent the face seal that has a larger cross-sectional thickness on one side thereof than the cross-sectional thickness on the other side thereof so that the convolution will tend to collapse at the other side thereof to maintain the seal on the lip around the opening when the spout has the abutment thereof interlocking with the abutment of the fill pipe.

23 Claims, 3 Drawing Sheets

FLUID DISPENSING NOZZLE CONSTRUCTION, BELLOWS-LIKE TUBE THEREFOR AND METHODS OF MAKING THE SAME

RELATED APPLICATIONS

The present application is a continuation application of Ser. No. 239,178, filed Aug. 31, 1989, abandoned, which application was a continuation of Ser. No. 16,633, filed Feb. 19, 1987, abandoned.

BACKGROUND OF THE INVENTION

1. Field of the Invention

This invention relates to a new fluid dispensing nozzle construction, such as for dispensing gasoline at a service station for filling the gasoline or fuel tanks of transportation vehicles and the like, and to a new flexible bellows-like tube therefor as well as to new methods of making such a new nozzle construction.

2. Prior Art Statement

It is known to provide a fluid dispensing nozzle construction comprising a valve body having a dispensing spout extending therefrom and a flexible bellows-like tube of polymeric material telescopically disposed on the spout and having opposed ends one of which is secured to the valve body and the other of which carries a face seal means for engaging an annular lip of a fill pipe of a fluid storage tank to seal around an opening in the fill pipe when the spout is inserted therein, the spout having an abutment means for interlocking with an abutment means of the fill pipe that is adjacent the opening thereof when the spout has been inserted into the opening a certain amount. For example, see the U.S. patent to McMath, U.S. Pat. No. 4,286,635 and the U.S. patent to Sunderhaus, U.S. Pat. No. 4,557,302.

SUMMARY OF THE INVENTION

It is one feature of this invention to provide a new fluid dispensing nozzle construction wherein the same has unique means for sealing around the opening of a fill pipe of a fluid storage tank so as to seal that opening from the atmosphere whereby the thus trapped vapors of the fluid can be withdrawn and recaptured by use of a vapor recovery system, if desired.

In particular, it was found, according to the teachings of this invention, that when the seal means is carried by a flexible bellows-like tube of polymeric material that is telescopically disposed on the spout of the nozzle construction and has opposed ends one of which is secured to the valve body of the construction and the other of which carries the face seal means for engaging the annular lip of a fill pipe, there is a tendency of the flexible bellows-like tube to cause the face seal to tilt or pivot on the annular lip of the fill pipe when the spout has an abutment means thereon interlocking with an abutment means of the fill pipe when the spout has been inserted into the opening a certain amount and the user has released the nozzle construction because the same is interlocked with the abutment of the fill pipe.

Accordingly, it was found according to the teachings of this invention, that such an adverse sealing condition could be substantially eliminated if an annular convolution of the flexible bellows-like tube that is adjacent the face seal means thereof has a larger cross-sectional thickness on one side thereof than the cross-sectional thickness on the other side thereof so that that convolution will tend to collapse at the other side thereof to maintain the seal on the lip around the opening of the fill pipe when the spout has the abutment means thereof interlocking with the abutment means of the fill pipe.

This arrangement readily permits the flexible bellows-like tube to act as a spring means for actuating an actuator of the valve body without requiring a metallic compression spring to be disposed between the face seal means and the actuator as in the aforementioned two U. S. patents.

Accordingly, it is an object of this invention to provide a new fluid dispensing nozzle construction comprising a valve body having a dispensing spout extending therefrom and a flexible bellows-like tube of polymeric material telescopically disposed on the spout and having opposed ends one of which is secured to the valve body and the other of which carries a face seal means for engaging an annular lip of a fill pipe of a fluid storage tank to seal around an opening in the fill pipe when the spout is inserted therein, the spout having an abutment means for interlocking with an abutment means of the fill pipe that is adjacent the opening thereof when the spout has been inserted into the opening a certain amount. The bellows-like tube has an annular convolution adjacent the face seal means that has a larger cross-sectional thickness on one side thereof than the cross-sectional thickness on the other side thereof so that the convolution will tend to collapse at the other side thereof to maintain the seal on the lip around the opening when the spout has the abutment means thereof interlocking with the abutment means of the fill pipe.

It is another object of this invention to provide a new flexible bellows-like tube for such a fluid dispensing nozzle construction, the flexible bellows-like tube of this invention having one or more of the novel features of this invention as set forth above or hereinafter shown or described.

Another object of this invention is to provide a new method of making such a fluid dispensing nozzle construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
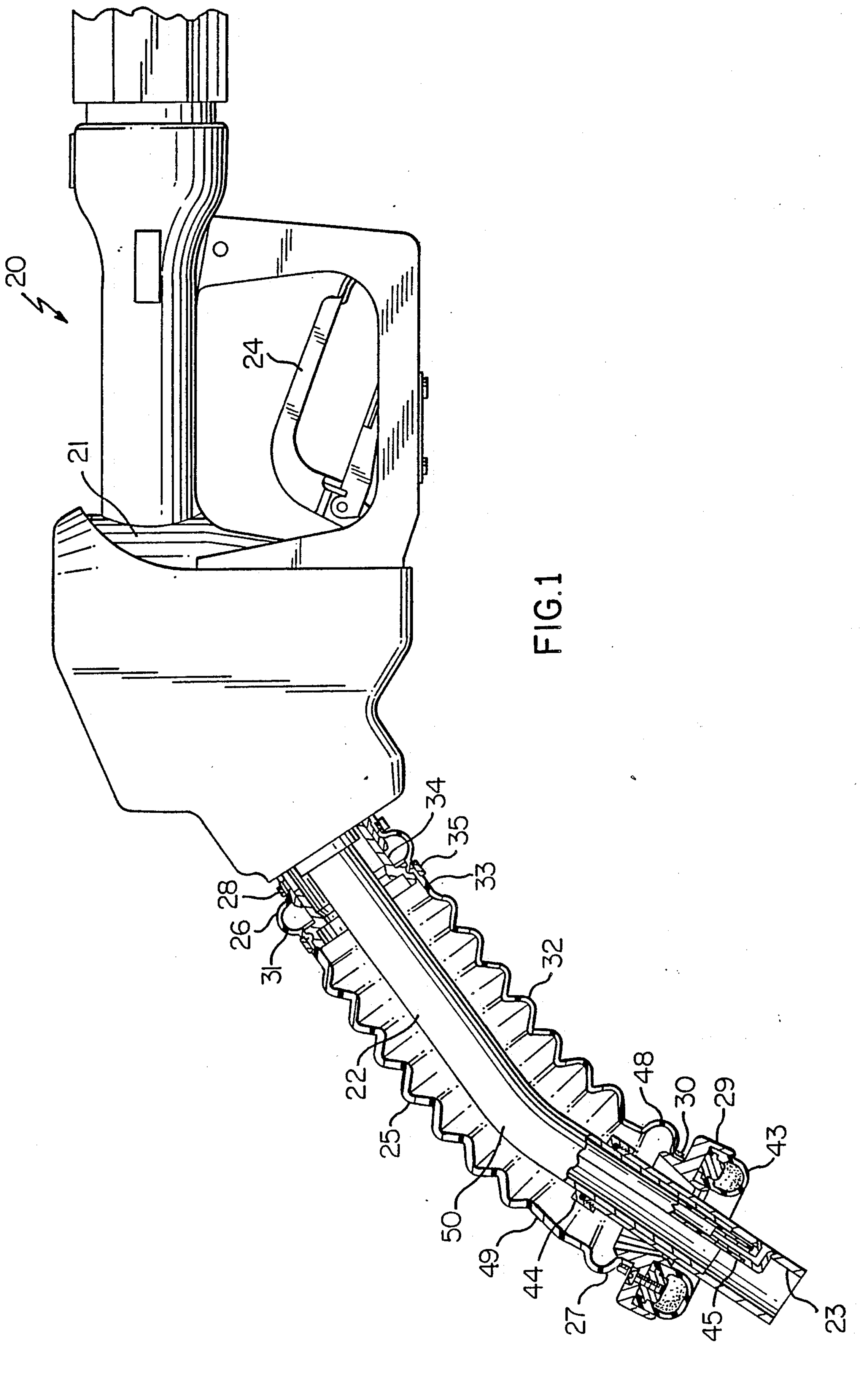
FIG. 1 is a fragmentary side view of the new fluid dispensing nozzle construction of this invention and illustrates the flexible bellows-like tube thereof in cross section and part of the dispensing spout thereof in cross section.

While the various features of this invention are hereinafter illustrated and described as being particularly adapted to provide a nozzle construction for dispensing fuel into the filler pipes of the gasoline storage tanks on automobiles and the like at conventional filling stations and the like wherein the nozzle construction is hand operated in a manner well known in the art, it is to be understood that the various features of this invention can be utilized singly or in various combinations thereof to provide nozzle constructions for dispensing other fluids as desired.

Therefore this invention is not to be limited to only the embodiment illustrated in the drawings, because the drawings are merely utilized to illustrate one of the wide variety of uses of this invention.

Referring now to FIG. 1, the new fluid dispensing nozzle construction of this invention is generally indicated by the reference numeral 20 and comprises a valve body 21 having a dispensing spout 22 extending therefrom for dispensing fluid out an open end 23 of the spout 22 when an operating lever 24 of the nozzle construction 20 is operated in a conventional manner and the valve body 21 is interconnected to a source of fluid by an interconnecting hose construction (not shown).

The fluid dispensing nozzle construction 20 also includes a flexible bellows-like tube 25 formed of any suitable polymeric material, such as urethane, and telescopically disposed on the spout 22 in concentrically spaced relation therefrom, the tube 25 having opposed ends 26 and 27 with the end 26 being secured to the valve body 21, such as by an annular clamp 28 in a manner conventional in the art, and with the other end 27 being secured to a face seal means 29 in any suitable manner, such as by the annular clamp 30 also in a manner conventional in the art.

The tube 25 has an annular convolution 31 adjacent the upper end 26 thereof and being separated from a plurality of annular body convolutions 32 by an annular section 33 of the tube 25 that is non-convoluted. The section 33 of the tube 25 is adapted to be interconnected to a movable actuator 34 of the nozzle construction 20 by being clamped thereto by an annular clamp 35 in a manner conventional in the art so as to move the actuator 34 when the spout 22 is being inserted into an opening 36, FIG. 2, of a fill pipe 37 because the tube 25 is being compressed between the valve body 21 and the fill pipe 37 for the reasons fully set forth in the aforementioned two U.S. patents, the U.S. patent to McMath, U.S. Pat. No. 4,286,635 and the U.S. patent to Sunderhaus, U.S. Pat. No. 4,557,302, whereby these two U.S. patents are being incorporated into this disclosure by this reference thereto.

Therefore, since the general operation of the fluid dispensing nozzle construction 20 and the use of the bellows-like tube 25 both as a vapor recovery means and as a spring force means for operating an actuator 34 is well known in the art, as evidenced by the aforementioned two U.S. patents, only the features thereof that are necessary to understand the features of this invention will be hereinafter set forth.

Figure 2:
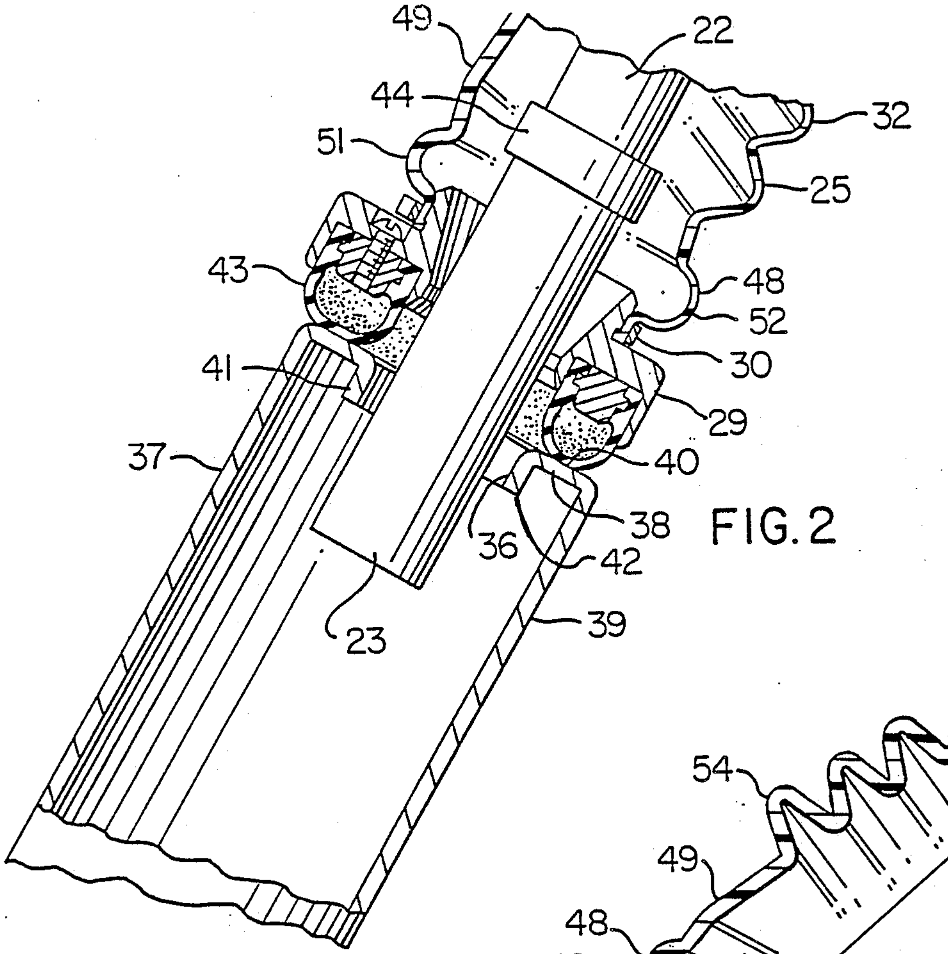
FIG. 2 is an enlarged fragmentary view of the nozzle construction of FIG. 1 being initially inserted into a fill pipe of a fluid storage tank.
Figure 3:
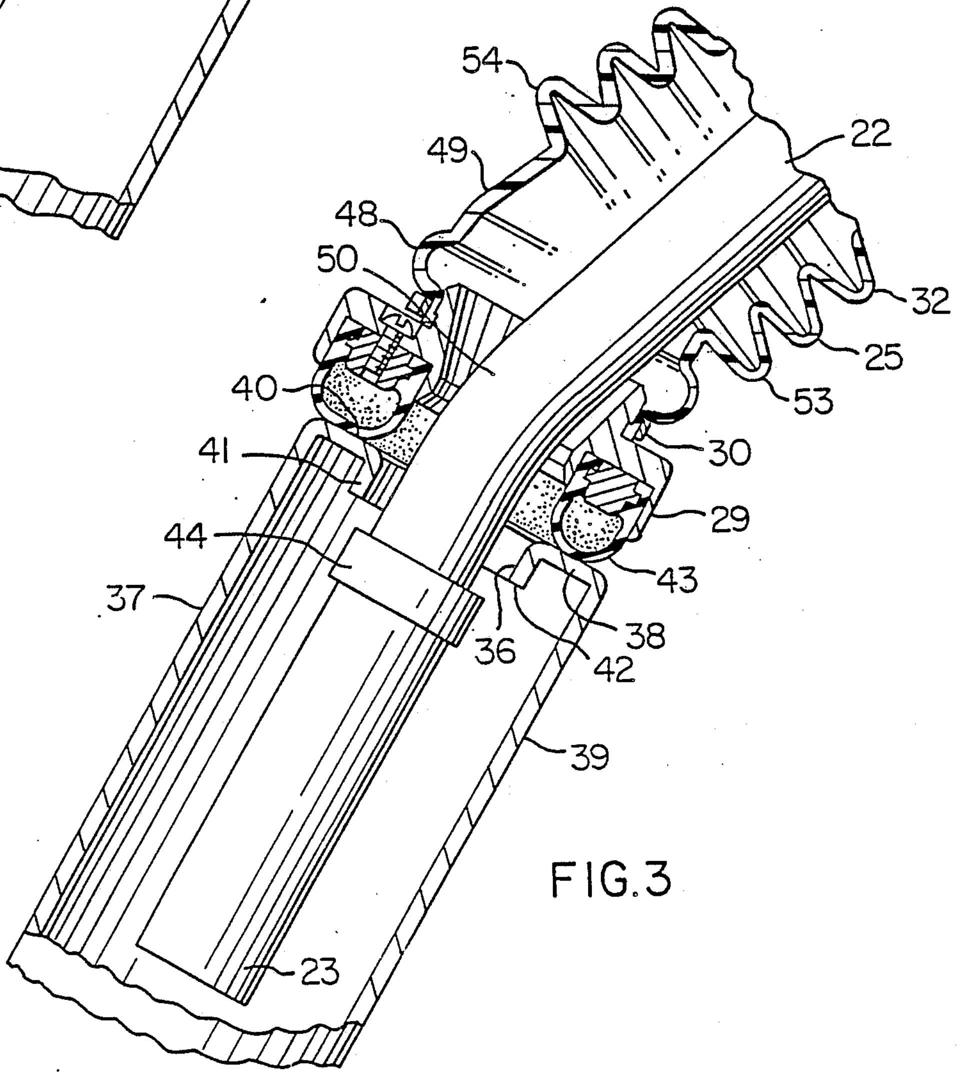
FIG. 3 is a view similar to FIG. 2 and illustrates the nozzle construction having its spout fully inserted in the fill pipe and before the nozzle construction has been tilted downwardly to interlock the abutment means of the spout with the abutment means of the fill pipe.

As illustrated in FIGS. 2 and 3 the fill pipe 37 has an annular lip 38 surrounding the opening 36 thereof and joining with an external side wall means 39 thereof whereby the annular lip 38 provides a substantially flat annular outer surface 40, the fill pipe 37 having an inwardly turned axial section 41 defining the opening 36 thereof and providing an annular abutment means 42 for a purpose hereinafter described.

The seal means 29 carried on the lower end 27 of the tube 25 has a face seal 43 formed of flexible sealing material, such as any suitable polymeric material, that is adapted to engage against the flat surface 40 of the lip 38 of the fill pipe 37 as the spout 22 has its end 23 being inserted into the opening 36 in a conventional manner.

Figure 4:
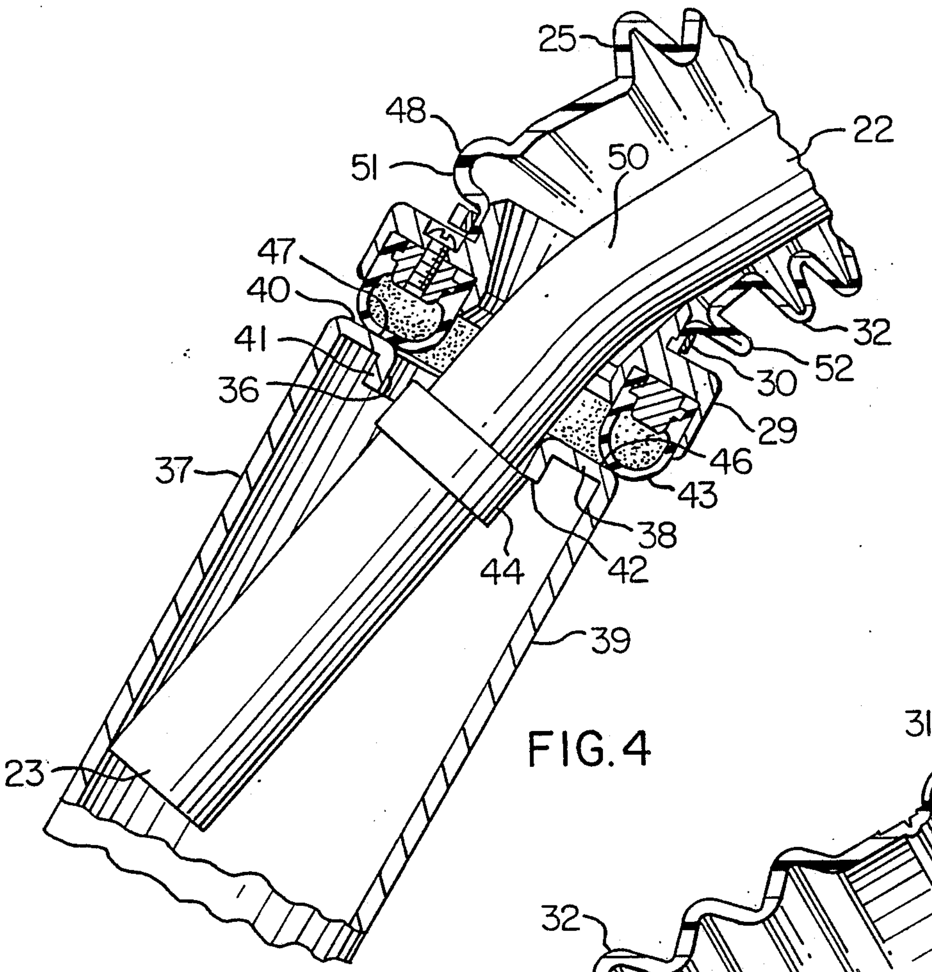
FIG. 4 is a view similar to FIG. 3 and illustrates the nozzle construction after the nozzle construction has been tilted downwardly to interlock the abutment means of the spout with the abutment means of the fill pipe.

It is intended that the face seal 43 of the seal means 29 will completely seal around the opening 36 of the fill pipe 37 in the manner illustrated in FIG. 2 even when the spout 22 has been fully inserted into the fill pipe 37 in the manner illustrated in FIG. 3 so that an annular abutment means 44 of the spout 22 has cleared beyond the abutment means 42 of the fill pipe 37 to permit the spout 22 and, thus, the nozzle construction 20 to be tilted downwardly in the manner illustrated in FIG. 4 and have the abutment means 44 of the spout 22 engaged against the abutment means 42 of the fill pipe 37 so that the operator of the nozzle construction 20 can release the nozzle construction 20 and the nozzle construction 20 will continue to remain in the position illustrated in FIG. 4 and dispense fuel into the fill pipe 37 because the actuating lever 24 thereof has been latched in a dispensing position thereof in a manner conventional in the art. Such a nozzle construction 20 has means 45, FIG. 1, for automatically turning off the fluid flow through the nozzle construction 20 from such a fluid dispensing operation when the level of fuel in the fill pipe 37 has reached a certain level in a conventional manner.

During such fluid dispensing operation with the nozzle construction 20, it is intended that the vapors of the fuel not only being dispensed by the nozzle construction 20 but also issuing from the fuel being stored in the storage compartment (not shown) to which the fill pipe 37 leads, are to be prevented from reaching the atmosphere by the annular seal means 29 sealing on the rim 38 of the fill pipe 37 and are to be withdrawn from the fill pipe 37 through the space between the spout 22 and the tube 25 back through the nozzle construction 20 by a conventional vapor recovery system as set forth in the aforementioned two U.S. patents.

As previously stated, it was found according to the teachings of this invention, that when the nozzle construction 20 is being tilted downwardly by the operator from the position illustrated in FIG. 3 to the position illustrated in FIG. 4 to interlock the abutment means 44 of the spout 22 to the abutment means 42 of the fill pipe 37, there was a tendency of the face seal means 29 to pivot on the lower part 46 of the rim 38 of the fill pipe 37 so that the face seal 43 is tilted out of sealing engagement with the upper part 47 of the rim 38 of the fill pipe 37 so that gasoline vapors would tend to escape to the atmosphere.

This adverse tilting feature of the face seal means 29 has been overcome in the past by utilizing a coiled metallic compression spring disposed inside the tube 25 and telescoped on the spout 22 to operate between the seal means 29 and the valve body 21 as set forth in the aforementioned two U.S. patents.

However, it was found according to the teachings of this invention that the tube 25 could be formed in a unique manner to not only overcome the tilting problem of the face seal means 29 but also to permit the elimination of the metallic compression spring as the tube 25 itself can perform all of the functions that the metallic spring means had provided in the past.

In particular, the tube 25 of this invention has an annular convolution 48 adjacent the lower end 27 thereof and thus, adjacent the seal means 29, while being spaced from the next adjacent main body convolution 32 by a non-convoluted section 49 of the tube 25, the section 49 being angled in a manner similar to the angle 50 provided in the spout 22 so as to permit the tube 25 to generally conform to the profile of the spout 22 in the manner illustrated in FIG. 1 and permit the face seal means 29 to be disposed substantially perpendicular to the spout end 23 as the spout end 23 is being initially inserted in the opening 36 of the fill pipe 37 as illustrated in FIGS. 2 and 3.

In addition, the tube 25 of this invention is formed so that the upper side 51 of the annular convolution 48 has a cross-sectional thickness that is greater than the cross-sectional thickness of the lower side 52 of that annular convolution 48, such difference in thickness being emphasized in the drawings with the understanding that such difference in thickness can be any suitable ratio that will cause the tube 25 to function in a manner hereinafter set forth.

Figure 6:
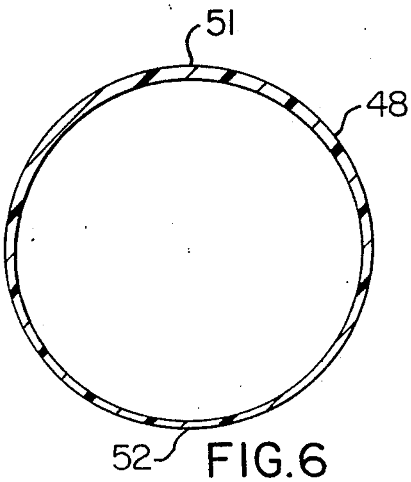
FIG. 6 is an axial cross-sectional view taken on line 6—6 of FIG. 5.

The wall of the convolution 48 between the top 51 thereof and the bottom 52 thereof has its thickness tapered downwardly from the top 51 to the bottom 52 in a continuous manner as illustrated in FIG. 6.

It has been found that by so constructing the convolution 48 of the tube 25 so that the upper portion 51 thereof is thicker than the lower portion 52 thereof, the lower portion 52 of the convolution 48 readily collapses in the manner illustrated in FIG. 4 while the upper portion 51 of the convolution 48 remains in a non-collapsed condition as the spout 22 is being tilted downwardly relative to the fill pipe 37 to interlock the abutment 44 thereof with the abutment means 42 of the fill pipe 37 and thereby prevents the tilted tube 25 from causing the seal means 29 to pivot at the point 46 on the rim 39 and the compressed relation of the tube 25 between the rim 39 and the valve body 21 maintains the face seal 43 in full engagement at the point 47 on the rim 39 of the fill pipe 37 so that an annular sealing is provided completely around the opening 26 as illustrated in FIG. 4 to prevent any escape of vapors from between the seal means 29 and the fill pipe 37. Of course, the convolution 48 of the tube 25 in this position thereof, progressively decreases in its compressed condition from the fully compressed condition at the bottom 52 thereof as the convolution 48 extends toward the top 51 thereof where the compressed condition of the top 51 is slight if at all.

Figure 5:
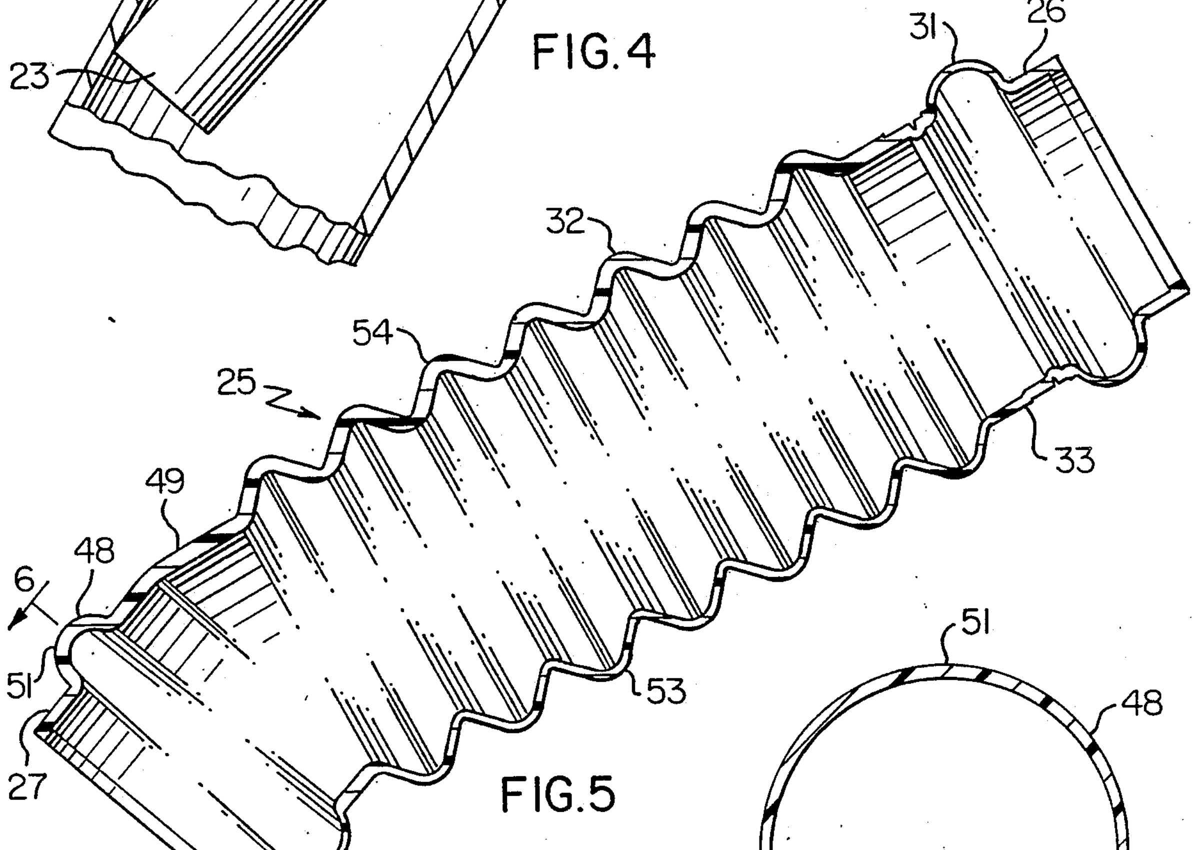
FIG. 5 is an enlarged longitudinal cross-sectional view of the flexible bellows-like tube of this invention that is utilized to form the nozzle construction of FIG. 1.

In order to form the tube 25 in the above manner, the same can be made by blow molding, extrusion molding, injection molding, etc, so that the entire lower portion 53 of the tube 25 has approximately the same thickness as the lower portion 52 of the convolution 48 while the entire upper part 54 of the tube 25 has the same thickness as the thickness of the upper part 51 of the convolution 48 as illustrated in FIGS. 5 and 6 of the drawings.

While this invention is not to be limited to any particular thicknesses of the various parts of the tube 25 thereof, it has been found in one working embodiment of the tube 25 of this invention that when the upper part 51 of the convolution 48 has a thickness of between approximately 0.095 of an inch to approximately 0.080 of an inch, the lower portion 52 of the convolution 48 can have a thickness of between approximately 0.070 of an inch to approximately 0.050 of an inch. Also, in such an embodiment of the tube 25, the upper portions 54 of the body convolutions 32 can have the same thickness as the thickness of the upper portion 51 of the convolution 48 while the lower portions 53 of the body convolutions 32 can have a thickness of between approximately 0.060 of an inch to approximately 0.045 of an inch.

Of course, when the spout 22 has its abutment means 44 uncoupled from the abutment means 42 of the fill pipe 37 by the operator tilting the nozzle construction 20 upwardly, the operator can remove the spout 22 therefrom and the collapsed portion 52 of the annular convolution 48 returns to its normal condition as illustrated in FIG. 1 so that the nozzle construction 20 can again be used in the manner previously set forth to dispense fuel into another fill pipe 37.

Therefore, it can be seen that this invention not only provides a new nozzle construction for dispensing fluid or the like and a new method of making such a nozzle construction, but also this invention provides a new flexible bellows-like tube for such a nozzle construction and a new method of making such a tube.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a fluid dispensing nozzle adapted to discharge fluid into a storage tank having a fill pipe disposed on a relatively low angle from a vertical position, where the fill pipe terminates in an upper end defined by an annular lip, said nozzle comprising a valve body, a spout having an inner portion extending from said body and terminating in an outer portion, a polymeric material, flexible, resilient tube telescopingly disposed on said spout in spaced relation thereto, said tube having a wall and an inner portion secured to the valve body and terminating in an outer portion, said tube including bellows means comprising at least one annular convolution formed along the length of the tube, and a face seal means mounted on the outer portion of the tube and adapted to sealingly engage said annular lip upon insertion of the spout into the fill pipe and compression of the bellows means, said nozzle, when the spout is inserted into the fill pipe, being angled so that its components each have, respectively, an upper side and a lower side, the improvement wherein the upper side of the tube wall, along the length of the bellows means, has a greater thickness than the lesser thickness of the lower side of the tube wall, whereby the lower side of the bellows means will tend to collapse to a greater extent than the upper side thereof in maintaining the face seal means in engagement with said annular lip when the nozzle spout is inserted in the fill pipe and disposed at a greater angle from a vertical position than the fill pipe.

2. In a fluid dispensing nozzle as set forth in claim 1 wherein the thickness of the tube wall along the length of the bellows means gradually tapers from its greater thickness its lesser thickness.

3. In a fluid dispensing nozzle as set forth in claim 1 wherein the at least one annular convolution of the bellows means is disposed proximate to the face seal means.

4. In a fluid dispensing nozzle as set forth in claim 1 wherein said at least one annular convolution of the bellows means comprises an annular convolution proximate to the face seal means and a series of annular convolutions spaced therefrom by a non-convoluted section of the tube.

5. In a fluid dispensing nozzle as set forth in claim 4 wherein the outer portion of the spout is angled relative to the inner portion thereof, and the outer portion of the tube is angled relative to the inner portion thereof at approximately the same angle as between the portions of the spout, the juncture of the angled portions of the tube being intermediate the length of the of the non-convoluted section of the tube between the series of convolutions and the convolution proximate the face seal means.

6. In a fluid dispensing nozzle as set forth in claim 5 wherein the thickness of the tube wall along the length of the bellows means gradually tapers from its greater thickness its lesser thickness.

7. In a fluid dispensing nozzle as in claim 6 wherein the nozzle is adapted to discharge fluid into a tank fill pipe which further comprises abutment means disposed adjacent to and beneath the annular lip and the nozzle spout further comprises abutment means which are engageable with the abutment means of the fill pipe upon insertion of the spout into the said fill pipe and further upon angling of the spout relative to the fill pipe, whereby the greater extent of collapse of the lower side of the bellows means maintains the face seal means in engagement with the fill pipe lip when the abutment means are engaged.

8. In a fluid dispensing nozzle as set forth in claim 7 wherein the bellows means proximate the face seal means comprises a single convolution of said at least one convolution.

9. A tube for use in combination with a fluid dispensing nozzle in preventing the escape of vapors in the delivery of fuel into a storage tank having a fill pipe disposed on a relatively low angle from a vertical position, where the fill pipe terminates in an upper end defined by an annular lip, wherein the nozzle comprises a valve body, and a spout having an inner portion extending from said body and terminating in an outer portion, said tube having a wall and being formed of a polymeric, flexible, resilient material, said tube being adapted to be telescopingly disposed on said spout in spaced relation thereto, said tube having an inner portion which is adapted to be secured to the valve body and terminating in an outer portion, said tube including bellows means comprising at least one annular convolution formed along the length of the tube, the outer portion of the tube having an end adapted to have mounted thereon face seal means which are adapted to sealingly engage said annular lip upon insertion of the spout into the fill pipe and compression of the bellows means, said nozzle, when the spout is inserted into the fill pipe, being angled so that its components each have, respectively, an upper side and a lower side, said tube being characterized in that the upper side of the tube wall, along the length of the bellows means, has a greater thickness than the lesser thickness of the lower side of the tube wall, whereby the lower side of the bellows means will tend to collapse to a greater extent than the upper side thereof in maintaining the face seal means in engagement with said annular lip when the nozzle spout is inserted in the fill pipe and disposed at a greater angle from a vertical position than the fill pipe.

10. A tube as set forth in claim 9 wherein the thickness of the tube wall along the length of the bellows means gradually tapers from its greater thickness its lesser thickness.

11. A tube as set forth in claim 9 wherein the at least one annular convolution of the bellows means is disposed proximate the end of the outer portion of the tube on which the face seal means is to be mounted.

12. A tube as set forth in claim 9 wherein said at least one annular convolution of the bellows means comprises an annular convolution proximate to the end on which the face seal means is to be mounted and a series of annular convolutions spaced therefrom by a non-convoluted section of the tube.

13. A tube as set forth in claim 12 for use with a nozzle wherein the outer portion of the spout is angled relative to the inner portion thereof, and the outer portion of the tube is angled relative to the inner portion thereof at approximately the same angle as between the portions of the spout, the juncture of the angled portions of the tube being intermediate the length of the of the non-convoluted section of the tube between the series of convolutions and the convolution proximate the end on which the face seal means is to be mounted.

14. A tube as set forth in claim 13 wherein the thickness of the tube wall along the length of the bellows means gradually tapers from its greater thickness its lesser thickness.

15. A tube as set forth in claim 14 the bellows means proximate the end of the outer portion of the tube on which the face seal means is adapted to be mounted comprises a single convolution.

16. In a method of making a fluid dispensing nozzle adapted to discharge fluid into a storage tank having a fill pipe disposed on a relatively low angle from a vertical position, where the fill pipe terminates in an upper end defined by an annular lip, the method comprising the steps of providing a valve body, a spout having an inner portion extending from said body and terminating in an outer portion, a polymeric material, flexible, resilient tube telescopingly disposed on said spout in spaced relation thereto, said tube having a wall and an inner portion secured to the valve body and terminating in an outer portion, said tube including bellows means comprising at least one annular convolution formed along the length of the tube, and a face seal means mounted on the outer portion of the tube and adapted to sealingly engage said annular lip upon insertion of the spout into the fill pipe and compression of the bellows means, said nozzle, when the spout is inserted into the fill pipe, being angled so that its components each have, respectively, an upper side and a lower side, the improvement comprising the step of forming the upper side of the tube wall, along the length of the bellows means, with a greater thickness than the lesser thickness of the lower side of the tube wall, whereby the lower side of the bellows mean will tend to collapse to a greater extent than the upper side thereof in maintaining the face seal means in engagement with said annular lip when the nozzle spout is inserted in the fill pipe and disposed at a greater angle from a vertical position than the fill pipe.

17. In a method of making a fluid dispensing nozzle as set forth in claim 16 wherein the step of forming the upper side of the tube wall, along the length of the bellows means, with a greater thickness than the lesser thickness of the lower side of the tube wall, includes forming the thickness of the tube wall along the length of the bellows means with a gradual taper from its greater thickness its lesser thickness.

18. In a method of making a fluid dispensing nozzle as set forth in claim 17 wherein the at least one annular convolution of the bellows means is provided proximate to the face seal means.

19. In a method of making a fluid dispensing nozzle as set forth in claim 18 wherein said at least one annular convolution of the bellows means are provided as an annular convolution proximate to the face seal means and a series of annular convolutions spaced therefrom by a non-convoluted section of the tube.

20. In a method of making a fluid dispensing nozzle as set forth in claim 19 wherein the spout is provided with the outer portion thereof angled relative to the inner portion thereof, and the tube is provided with the outer portion thereof angled relative to the inner portion thereof at approximately the same angle as between the portions of the spout, the juncture of the angled portions of the tube being provided intermediate the length of the of the non-convoluted section of the tube between the series of convolutions and the convolution proximate the face seal means.

21. In a method of making a fluid dispensing nozzle as set forth in claim 20 wherein the step of forming the upper side of the tube wall, along the length of the bellows means, with a greater thickness than the lesser thickness of the lower side of the tube wall, includes forming the thickness of the tube wall along the length of the bellows means with a gradual taper from its greater thickness its lesser thickness.

22. In a method of making a fluid dispensing nozzle as in claim 20 wherein the nozzle is adapted to discharge fluid into a tank fill pipe which further comprises abutment means disposed adjacent to and beneath the annular lip the further step of providing abutment means on the spout which are engageable with the abutment means of the fill pipe upon insertion of the spout into the said fill pipe and further upon angling of the spout relative to the fill pipe, whereby the greater extent of collapse of the lower side of the bellows means maintains the face seal means in engagement with the fill pipe lip when the abutment means are engaged.

23. In a method of making a fluid dispensing nozzle as set forth in claim 22 wherein the bellows means, provided proximate the end of the tube on which the face seal means are mounted, comprises a single convolution of said at least one convolution.

* * * * *